United States Patent
Dively et al.

(10) Patent No.: US 9,385,514 B2
(45) Date of Patent: Jul. 5, 2016

(54) POWER HOUSING WITH ARTICULATING DOOR AND FACEPLATE ASSEMBLY

(71) Applicant: Marina Electrical Equipment, Inc., Williamsburg, VA (US)

(72) Inventors: Robert C Dively, Williamsburg, VA (US); Alston G Brooks, Grafton, VA (US); Kelly W Treiber, Williamsburg, VA (US)

(73) Assignee: MARINA ELECTRICAL EQUIPMENT, INC., Williamsburg, VA (US)

( * ) Notice: Subject to any disclaimer, the term of this patent is extended or adjusted under 35 U.S.C. 154(b) by 390 days.

(21) Appl. No.: 14/187,833

(22) Filed: Feb. 24, 2014

(65) Prior Publication Data
US 2014/0268693 A1 Sep. 18, 2014

Related U.S. Application Data

(60) Provisional application No. 61/788,878, filed on Mar. 15, 2013.

(51) Int. Cl.
*H02G 3/08* (2006.01)
*H02G 3/04* (2006.01)

(52) U.S. Cl.
CPC .................... *H02G 3/0493* (2013.01)

(58) Field of Classification Search
CPC ........... H02G 3/08; H02G 3/081; H02G 3/14; H02G 3/0493; H02G 3/00; H02G 3/02; H02G 3/088; H05K 5/00; H05K 5/02; H05K 5/03; H02B 1/26; H02B 1/30; H02B 1/38; H02B 1/50

USPC .......... 174/50, 66, 67, 37, 38, 520, 535, 542, 174/559, 55; 220/3.2–3.9, 4.02, 241, 242; 248/906, 530; 361/641, 600, 601, 645, 361/667, 679.01, 724; 52/3; 312/351.1, 312/351, 351.9, 223.1
See application file for complete search history.

(56) References Cited

U.S. PATENT DOCUMENTS

| | | | | |
|---|---|---|---|---|
| 3,341,268 A * | 9/1967 | Bickford | ................ | H01R 23/10 174/38 |
| 4,785,376 A * | 11/1988 | Dively | ................ | H02B 1/50 174/38 |
| 5,664,955 A * | 9/1997 | Arnett | ................ | H02G 3/14 174/67 |
| 6,616,005 B1 * | 9/2003 | Pereira | ................ | H02G 3/14 174/66 |
| 7,080,816 B1 * | 7/2006 | Vaccaro | ................ | F16M 11/28 248/530 |
| 7,361,832 B2 * | 4/2008 | Dively | ................ | H02G 3/088 174/37 |
| D578,965 S * | 10/2008 | Dively | ................ | D13/152 |
| 8,089,747 B2 * | 1/2012 | Storck | ................ | H02G 3/0493 174/38 |
| 8,847,070 B2 * | 9/2014 | Burke | ................ | H02B 1/50 174/37 |

* cited by examiner

*Primary Examiner* — Angel R Estrada
(74) *Attorney, Agent, or Firm* — Peter J. Van Bergen

(57) ABSTRACT

A power housing assembly includes a housing having a side thereof that is at least partially open. A faceplate, coupled to the open side at a first hinge position, can articulate about the first hinge position between a first position and a second position. The faceplate includes a substantially L-shaped portion that resides (i) in the housing when the faceplate is in its first position, and (ii) outside of the housing when the faceplate is in its second position.

19 Claims, 6 Drawing Sheets

POWER HOUSING WITH ARTICULATING DOOR AND FACEPLATE ASSEMBLY

Pursuant to 35 U.S.C. §119, the benefit of priority from provisional application 61/788,878, with a filing date of Mar. 15, 2013, is claimed for this non-provisional application.

FIELD OF THE INVENTION

The invention relates generally to power housings used in outdoor environments such as marinas and recreational vehicle parks, and more particularly to a power housing having an articulating door and faceplate assembly to facilitate access by both power users and maintenance personnel.

BACKGROUND OF THE INVENTION

Marinas and recreational vehicle (RV) parks provide power pedestals at a variety of outdoor locations. These power pedestals serve as the interface between power lines and "loads" (e.g., circuit breaker panels on boats, RVs, etc.) that require electric power. Mounted in the power housing portion of each such power pedestal are power plug receptacles, circuit breakers, power metering electronics, telecommunication ports, etc. Since these power pedestals are normally mounted in outdoor environments, the power housing portion of a power pedestal must be constructed to protect electrical components mounted therein. At the same time, the electrical components that must be accessed by a power user (e.g., receptacles and breaker switches) should be readily accessible. Still further, all electrical components should be accessible in a convenient fashion when service is required.

SUMMARY OF THE INVENTION

Accordingly, it is an object of the present invention to provide a power housing for a power pedestal.

Another object of the present invention is to provide a power housing for a power pedestal that facilitates access to components housed therein by both power users and maintenance personnel.

Other objects and advantages of the present invention will become more obvious hereinafter in the specification and drawings.

In accordance with the present invention, a power housing assembly includes a housing having a side thereof that is at least partially open. A faceplate is coupled to the open side of the housing at a first hinge position. The faceplate can rotate about the first hinge position between a first position and a second position. The faceplate includes a substantially L-shaped portion that resides (i) in the housing when the faceplate is in its first position, and (ii) outside of the housing when the faceplate is in its second position. The faceplate supports mounting of electrical components thereto. A wedge-shaped door can be coupled to the housing or faceplate at a second hinge position located above the first hinge position when the faceplate is in its first position. The door substantially covers the L-shaped portion of the faceplate when the faceplate is in its first position. The door is rotatable about the second hinge position to expose the L-shaped portion of the faceplate.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
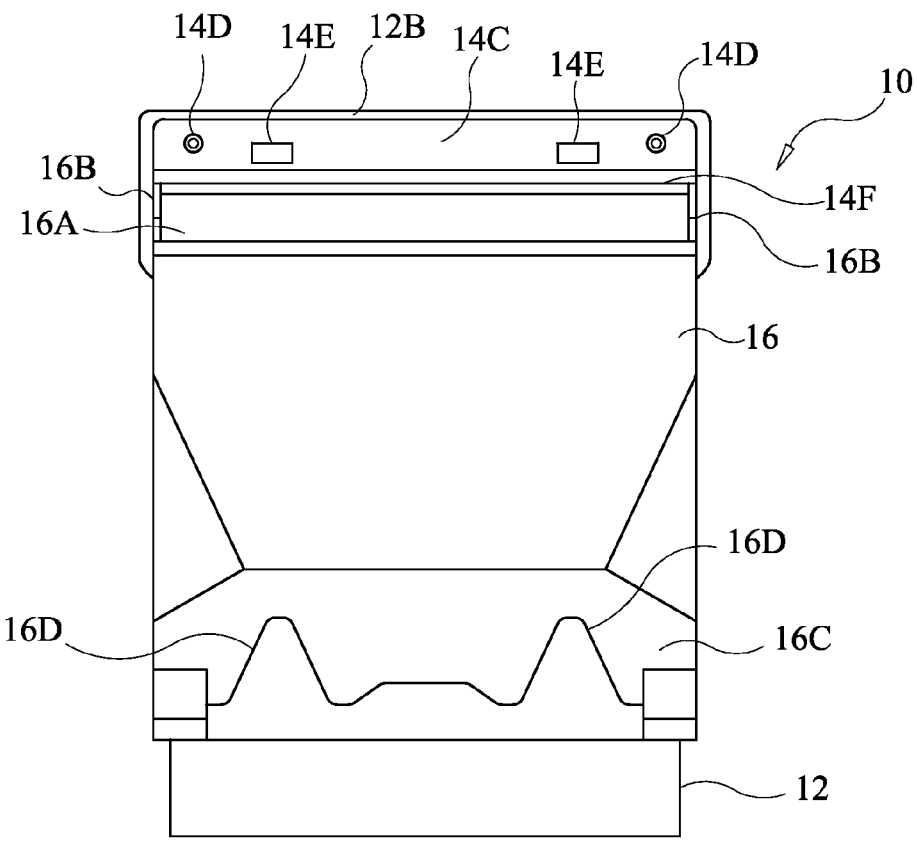
FIG. 1 is a front view of a power housing in accordance with an embodiment of the present invention with its door and faceplate assembly in a closed position.
Figure 2:
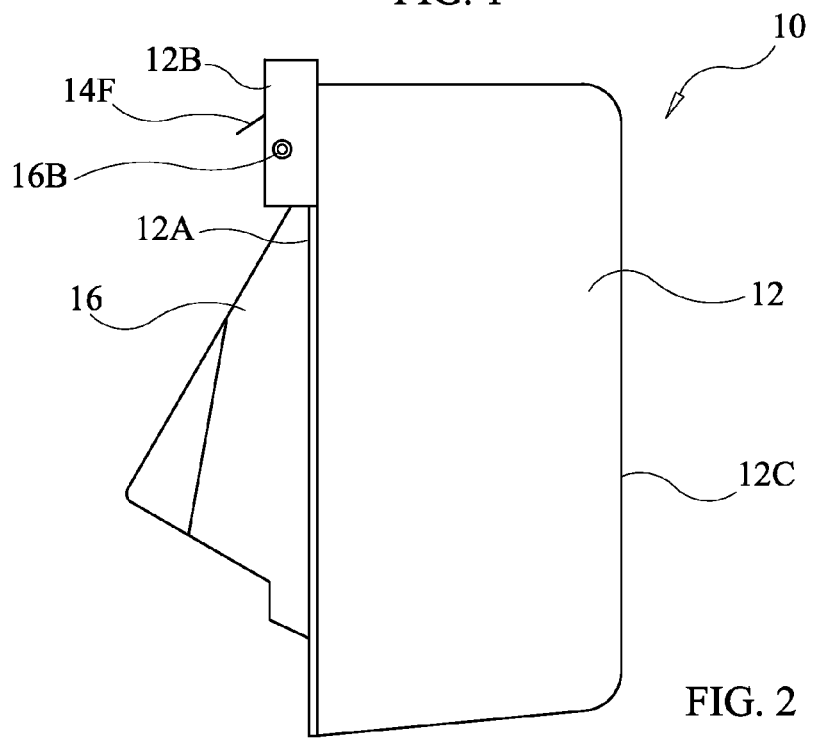
FIG. 2 is a side view of the power housing of FIG. 1 with its door and faceplate assembly in the closed position.

Referring now to the drawings, simultaneous reference will be made to FIGS. 1-4 where a power housing in accordance with an embodiment of the present invention is shown and is referenced generally by numeral 10. Power housing 10 can be mounted to (e.g., on top of) or integrated with a support structure or pedestal (not shown), the choice of which is not a limitation of the present invention. By way of an illustrative example, power housing 10 will be described for its use in supporting and protecting a number of electrical components. However, it is to be understood that the types and numbers of such electrical components are not limitations of the present invention.

Power housing 10 is generally made from one or more weather-resistant, rustproof materials such as plastics, composites, stainless steel, aluminum, etc. The particular choices of material for each component of power housing 10 are not limitations of the present invention.

Power housing 10 has three primary components that cooperate to protect electrical components housed therein, facilitate a power user's access to the electrical components needed for power usage, and facilitate a maintenance person's access to all of the electrical components for both installation and service operations. The three primary components are a main housing 12, a faceplate 14, and a door 16. All three primary components are made from rigid materials. As will be explained further below, faceplate 14 and door 16 are coupled to each to define an articulating assembly when faceplate 14 is coupled to main housing 12.

Figure 4:
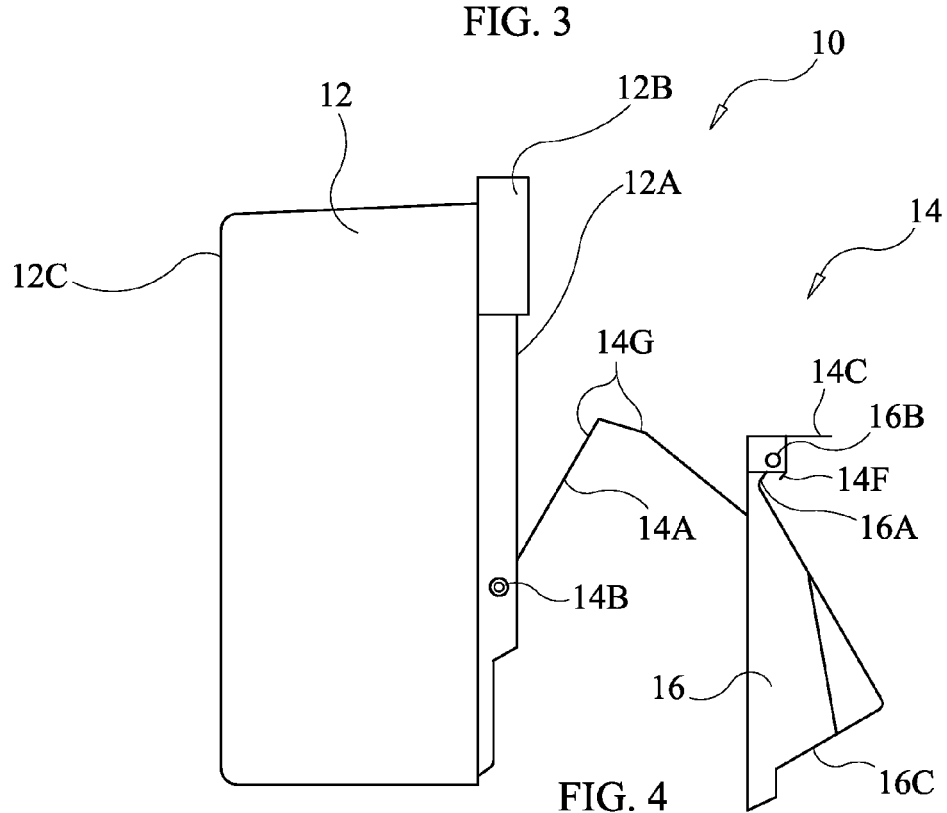
FIG. 4 is a side view of the power housing of FIG. 1 with its door and faceplate assembly articulated to the fully open position.

In the illustrated embodiment, main housing 12 is a substantially rectangular box molded from a rigid plastic or composite that includes one vertical side 12A that is at least partially open to facilitate access to the inside of main housing 12 when faceplate 14 and door 16 are fully open (FIG. 4). It is to be understood that the faceplate and door of the present invention can be used with a variety of sizes/shapes of main housing 12, and that the present invention is not limited to the illustrated rectangular box shape of main housing 12. At the top of open vertical side 12A, main housing 12 can define a hood 12B to shield the top region of faceplate 14 from moisture (e.g., rain, dew, etc.).

Figure 5:
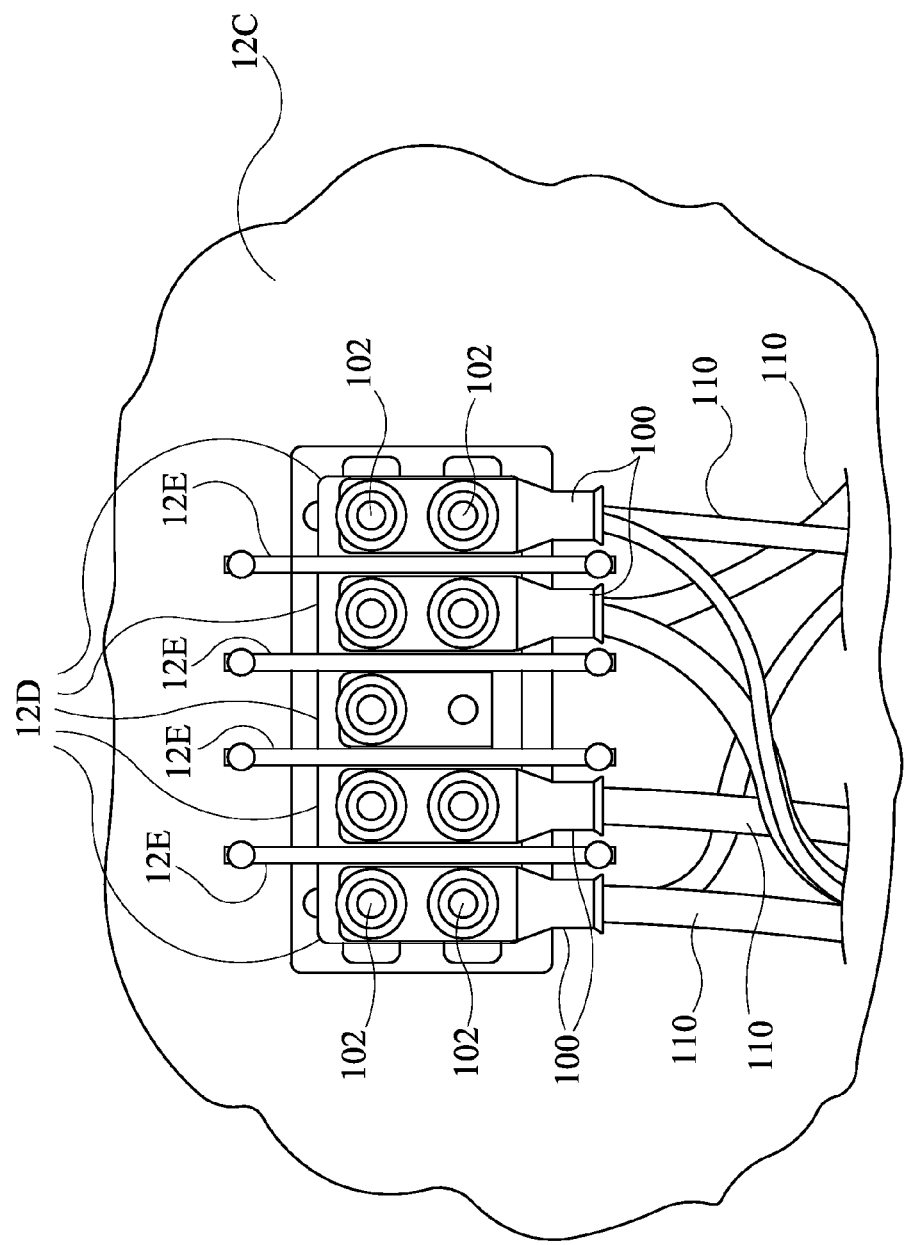
FIG. 5 is a plan view of a terminal block's electrically isolating elements molded into a wall of the power housing's main housing in accordance with an embodiment of the present invention.

Mounted in main housing 12 are those electrical components (not shown in FIGS. 1-4 for clarity of illustration) that generally need to be accessed by maintenance personnel such as terminal blocks. To facilitate this function, main housing 12 can integrate the electrically-isolating support portions of a terminal block directly into its structure during the fabrication of main housing 12. An exemplary embodiment of an integrated terminal block is illustrated in FIG. 5 where an interior portion of a wall 12C of main housing 12 is molded to integrate a number of terminal bosses 12D and separating/insulating walls 12E. Bosses 12D support electrically-conductive terminal posts 102 to which wire terminals 100 are coupled. Wires 110 electrically couple wire terminals 100 to the various electrical components that are mounted to faceplate 14 as will be described later herein. Wall 12C can be the back vertical wall opposing the open vertical side 12A or can be integrated into a side wall of housing 12 without departing from the scope of the present invention. Adjacent terminal bosses 12D are separated by electrically insulating walls 12E that extend away from bosses 12D, i.e., out of the paper in the figure.

Faceplate 14 is a three-dimensionally shaped plate (e.g., substantially Z-shaped) with a number of mounting holes cut therein that facilitate the installation/mounting of electrical components that must be accessible to power users and maintenance personnel. In general, the portions of electrical components relevant to a power user are accessible when only door 16 is open (FIG. 3), whereas the portions of the electrical components relevant to maintenance personnel are accessible when faceplate 14 and door 16 are articulated to their fully open position (FIG. 4).

A lower portion 14A of faceplate 14 is coupled to main housing 12 in a hinged fashion as indicated at 14B to support rotation of faceplate 14 between its closed position (FIGS. 1-3) and its fully open position (FIG. 4). When in the fully closed position, an upper portion 14C of faceplate 14 is attachable to main housing 12 beneath hood 12B using, for example, screws 14D. Upper portion 14C includes holes 14E and used to mount power meter displays/counters (not shown) that can be read when both faceplate 14 and door 16 are in their closed position (FIG. 1). Faceplate 14 can include a lip 14F extending out from upper portion 14C to facilitate the gripping of faceplate 14 when moving it to the open position (FIG. 4) once screws 14D have been loosened/removed. A middle portion 14G of faceplate 14 is substantially L-shaped to fit within main housing 12 when faceplate 14 is in the closed position and be accessible when faceplate 14 is rotated to its open position. Middle portion 14G is provided with receptacle mounting holes 14H, circuit breaker mounting holes 14I, a power meter mounting hole 14J, and a telecommunications port mounting hole 14K. Additional mounting holes can be provided as needed. Further, the size and/or shape of the various mounting holes can be varied to accommodate the various makes/sizes/shapes of receptacles, breakers, meters, etc., without departing from the scope of the present invention.

Figure 3:
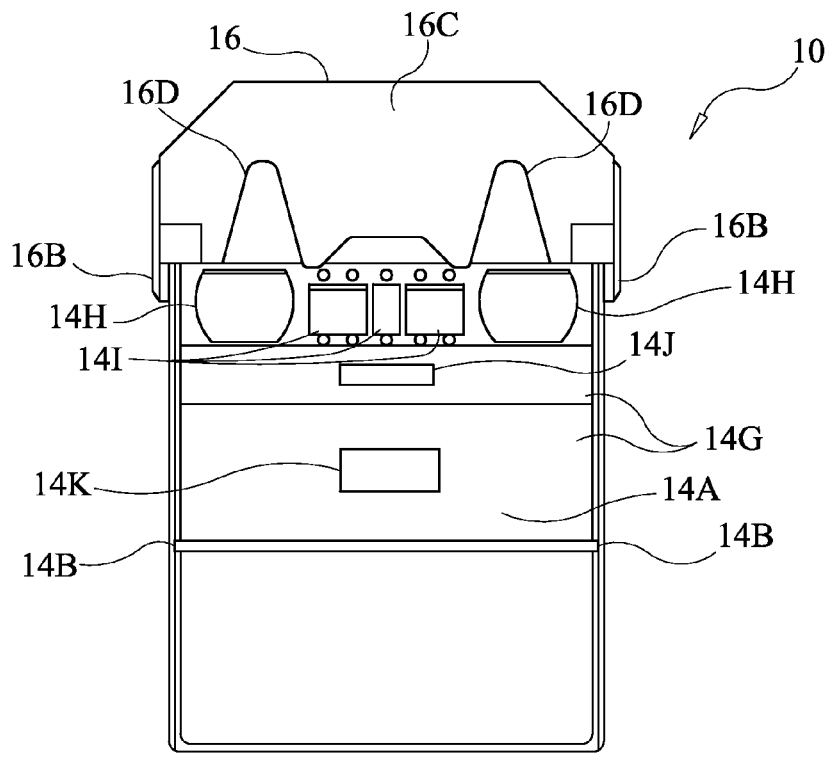
FIG. 3 is a front view of the power housing of FIG. 1 with its door in an open position.

Door 16 is a substantially wedge-shaped hollow shell that protrudes away from main housing 12 and faceplate 14. Door 16 has its upper portion 16A coupled to faceplate 14 in a hinged fashion at the juncture of middle portion 14G and upper portion 14C as indicated at 16B. In the closed position of faceplate 14, hinge 16B is located above hinge 14B but under upper portion 14C of faceplate 14 to leave upper portion 14C exposed under hood 12B. This allows door 16 to be opened upward (FIG. 1) to provide a power user (or maintenance personnel) access to one side of middle portion 14G while faceplate 14 remains in place in main housing 12 as shown in FIG. 3. This also provides a maintenance person with ready access to screws 14D and allows door 16 to be articulated away from faceplate 14 when faceplate 14 is pivoted away from main housing 12 (for maintenance purposes) as shown in FIG. 4 to provide ready access to the other side of middle portion 14G as well as the interior regions of main housing 12. The lower portion 16C of door 16 has two open-ended slots 16D formed therein through which load power lines (not shown) can be led once the power lines are plugged into receptacles (not shown) mounted to faceplate 14. A single slot could be used without departing from the scope of the present invention. The wedge shape of door 16 provides the space needed for the power lines/plugs, while also protecting the plugs/receptacles from rain/moisture even in windy conditions.

Figure 6:
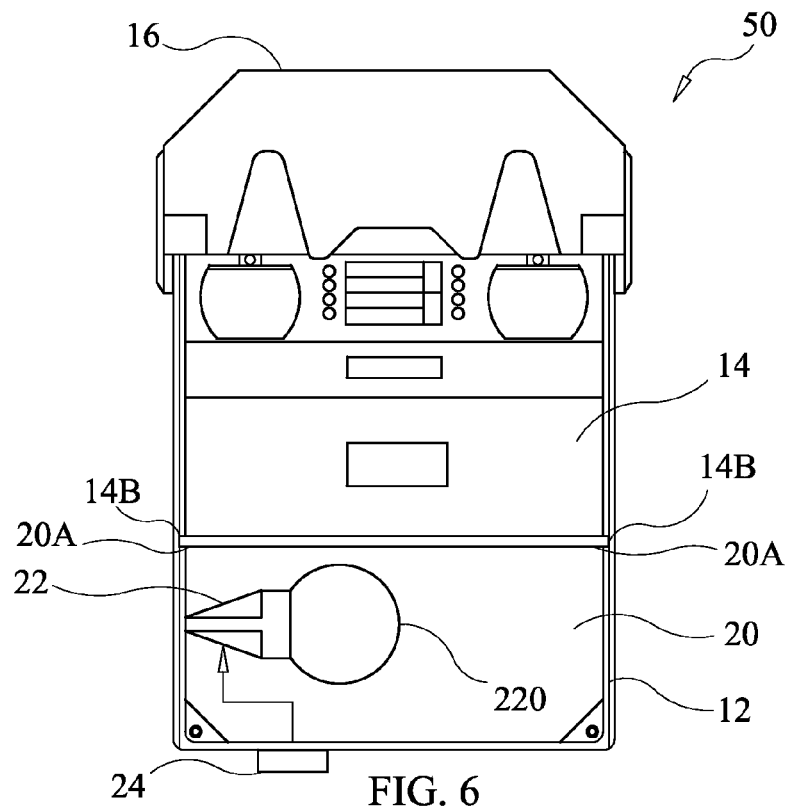
FIG. 6 is a front view of a power housing in accordance with another embodiment of the present invention with its door in an open position.
Figure 7:
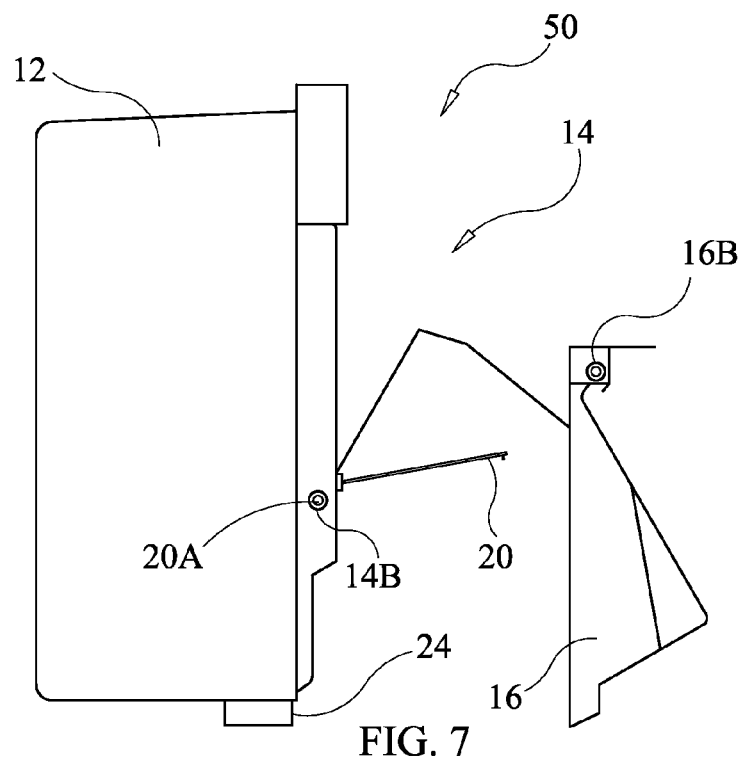
FIG. 7 is a side view of the power housing of FIG. 6 with its door and faceplate assembly articulated to the fully open position, and with its lens cover in an open position.

The power housing of the present invention can also house a light fixture to provide illumination during times of low ambient light. More specifically, FIGS. 6 and 7 illustrate a power housing 50 that has a transparent or translucent lens 20 coupled to main housing 12 in a hinged fashion as indicated at 20A. Hinge points 20A can be (but need not be) the same as hinge points 14B as illustrated. Mounted within main housing 12 behind lens 20 is a light fixture 22 that can have a light bulb 220 coupled thereto. A light sensor/controller 24 can be mounted in a wall of main housing 12 and coupled to light fixture 22 in order to automatically control a supply (not shown) of electricity to light fixture 22 to thereby turn light bulb 220 on or off based on the amount of ambient light. Such sensors/controllers and their operation are well understood in the art.

Figure 8:
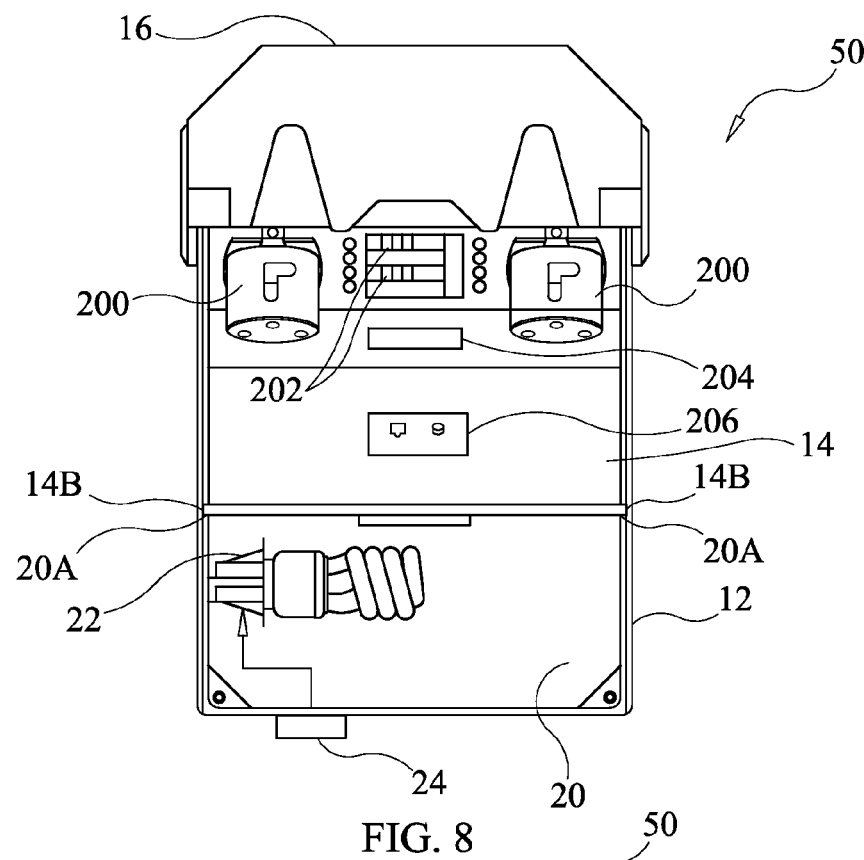
FIG. 8 is a front view of the power housing of FIG. 6 with its door open to illustrate electrical components installed therein and accessible to a power user.
Figure 9:
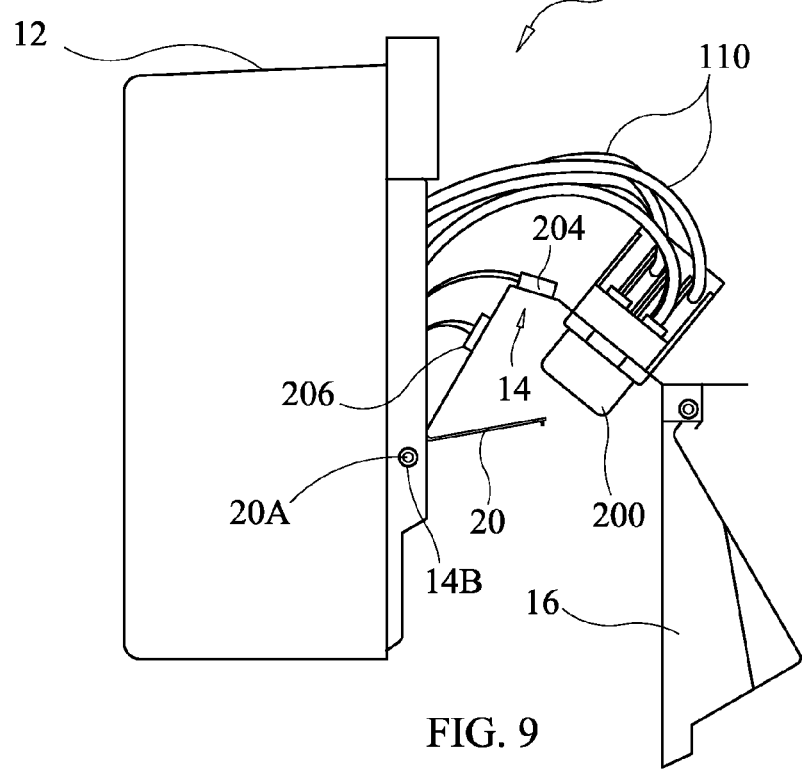
FIG. 9 is a side view of the power housing assembly of FIG. 8 with its door and faceplate articulated to the fully open position to provide maintenance personnel with access to electrical components installed therein.

To facilitate an operational understanding of the present invention, FIGS. 8 and 9 illustrate power housing 50 with exemplary electrical components mounted therein. More specifically, FIG. 8 illustrates power housing 50 with only its door 16 open to thereby provide a power user with access to the user side of receptacles 200, breaker switches 202, a power meter 204, and telecommunication ports 206, all of which are mounted in faceplate 14. FIG. 9 illustrates power housing 50 with the door 16/faceplate 14 combination articulated to their fully open position and with lens 20 open to thereby provide maintenance personnel with simultaneous access to wires 110 coupling the above-described electrical components mounted to faceplate 14 to the terminal posts 102 (FIG. 5) provided in housing 12. That is, the power user sides of the electrical components are readily accessed when faceplate 14 is in its closed position, while the maintenance sides of the electrical components are readily accessed when faceplate 14 is in its open position.

Figure 10:
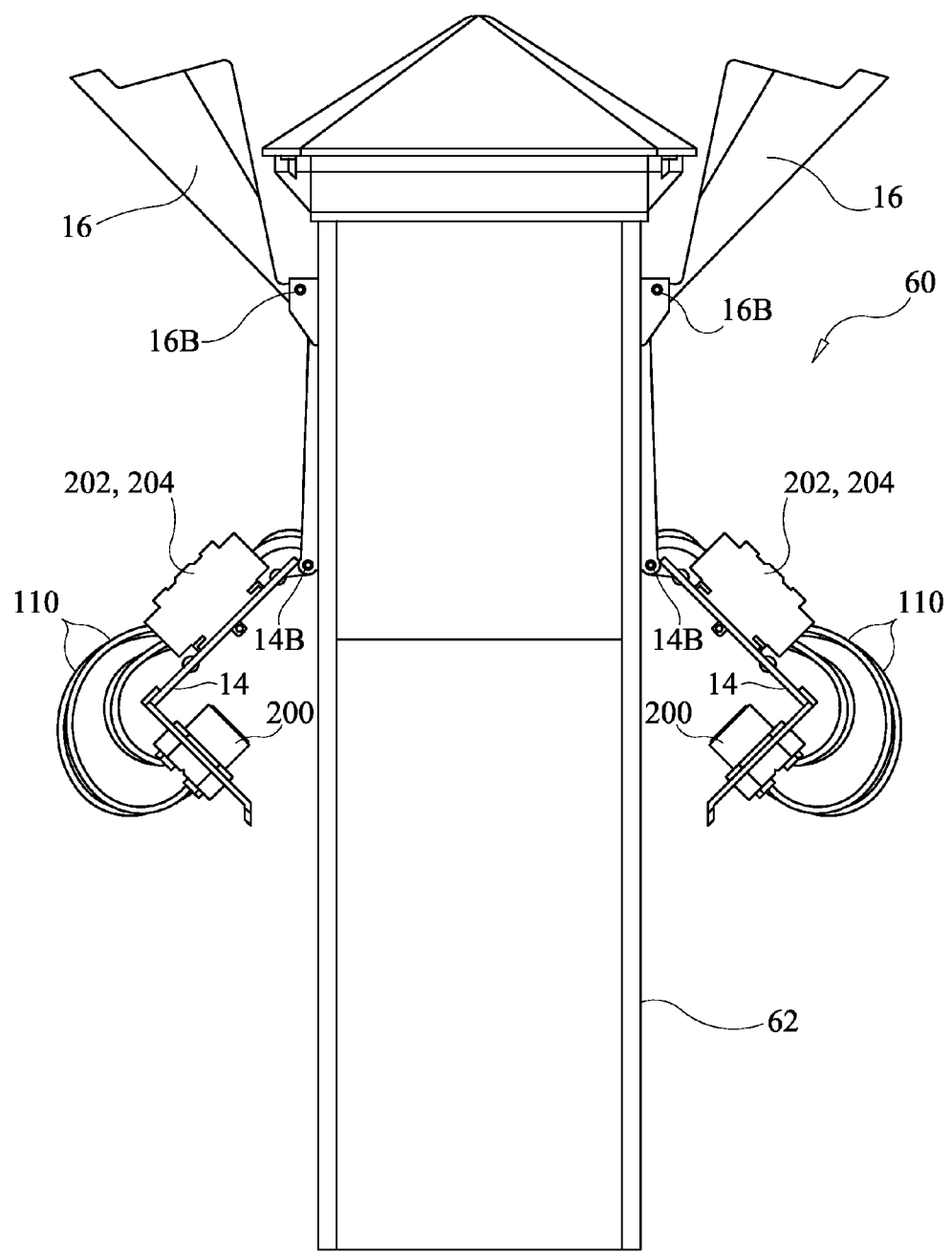
FIG. 10 is a side view of a power housing assembly in accordance with another embodiment of the present invention illustrating its door and faceplate articulated to the fully open position to provide maintenance personnel with access to electrical components installed therein.

Another embodiment of a power housing in accordance with the present invention is illustrated in FIG. 10 and is referenced generally by numeral 60. The same reference numerals will be used for those elements that are common to the previously-described power housings. Main housing 62 is analogous to housing 12, but is a free-standing pedestal structure supporting faceplate/door assemblies and their corresponding electrical components on opposing sides of housing 62. In this embodiment, faceplate 14 is hinged at 14B to housing 12 and door 16 is hinged to housing 62 at 16B above hinge 14B. FIG. 10 illustrates faceplate 14 and door 16 in their open positions to facilitate access by maintenance personnel to electrical components 200, etc., and wires 110. Similar to the previous embodiments, faceplate 14 is articulated to its open position (as shown) by simply removing screws (not shown) that couple upper portion 14C to housing 62 when faceplate 14 is articulated to its closed position. In the closed position of faceplate 14, the maintenance sides of electrical components 200, etc. and wires 110 are positioned/contained within housing 62 thereby facilitating access to the power use sides of the electrical components. Wires 110 would be connected to an integrated terminal block such as that shown in FIG. 5.

The advantages of the present invention are numerous. The power housing simplifies access to housed electrical components by both a power user and maintenance personnel. The articulating door/faceplate assembly eliminates the need to dismantle the housing in order to repair/replace the various electrical components housed therein.

Although the invention has been described relative to a specific embodiment thereof, there are numerous variations and modifications that will be readily apparent to those skilled in the art in light of the above teachings. For example, rather than mounting power counters/meters in upper portion 14C of faceplate 14, the power counter/meters could be mounted to and behind lens 20 so that they are completely protected from moisture yet still visible from outside of main housing 12. It is therefore to be understood that the invention may be practiced other than as specifically described.

What is claimed as new and desired to be secured by Letters Patent of the United States is:

1. A power housing assembly, comprising:
    a housing having a side thereof that is at least partially open; and
    a faceplate coupled to said side of said housing at a first hinge position wherein said faceplate can rotate about said first hinge position between a first position and a second position, said faceplate including a substantially L-shaped portion that resides (i) in said housing when said faceplate is in said first position, and (ii) outside of said housing when said faceplate is in said second position, said faceplate adapted to support mounting of electrical components thereto.

2. A power housing assembly as in claim 1, further comprising a wedge-shaped door coupled to said faceplate at a second hinge position located above said first hinge position when said faceplate is in said first position, wherein said door substantially covers said L-shaped portion when said faceplate is in said first position and is rotatable about said second hinge position to expose said L-shaped portion.

3. A power housing assembly as in claim 1, further comprising a hood coupled to said housing for shielding a portion of said faceplate when said faceplate is in said first position.

4. A power housing assembly as in claim 1, further comprising a terminal block coupled to an interior portion of said housing, said terminal block being made from an electrically insulating material, said terminal block including:
    bosses adapted to support electrically-conductive terminal posts; and
    a wall between adjacent ones of said bosses.

5. A power housing assembly as in claim 1, wherein said door has at least one open-ended slot adapted to receive a power line therethrough.

6. A power housing assembly as in claim 1, further comprising:
    a light fixture mounted in said housing; and
    a translucent lens hingedly coupled to said housing at said side, said translucent lens disposed adjacent to said light fixture.

7. A power housing assembly as in claim 6, further comprising a light sensor coupled to said light fixture for sensing ambient light conditions and adapted to control a supply of electrical energy to said light fixture based on the ambient light conditions sensed.

8. A power housing assembly, comprising:
    a housing having a side thereof that is at least partially open;
    a faceplate coupled to said side of said housing at a first hinge position wherein said faceplate can rotate about said first hinge position between a first position and a second position, said faceplate including a first portion and a second portion, said first portion attachable to said housing when said faceplate is in said first position, said second portion being substantially L-shaped and residing (i) in said housing when said faceplate is in said first position, and (ii) outside of said housing when said faceplate is in said second position, said faceplate including a plurality of mounting holes; and
    a plurality of electrical components, each of said electrical components coupled to said faceplate at one of said mounting holes, wherein access to portions of said electrical components requiring maintenance are accessible only when said faceplate is in said second position.

9. A power housing assembly as in claim 8, further comprising a wedge-shaped door coupled to said faceplate at a second hinge position located above said first hinge position when said faceplate is in said first position, wherein said door substantially covers said second portion when said faceplate is in said first position and is rotatable about said second hinge position to expose said second portion.

10. A power housing assembly as in claim 8, further comprising a hood coupled to said housing for shielding said first portion of said faceplate when said faceplate is in said first position.

11. A power housing assembly as in claim 8, further comprising a terminal block coupled to an interior portion of said housing, said terminal block being made from an electrically insulating material, said terminal block including:
    bosses adapted to support electrically-conductive terminal posts; and
    a wall between adjacent ones of said bosses.

12. A power housing assembly as in claim 8, wherein said door has at least one open-ended slot adapted to receive a power line therethrough.

13. A power housing assembly as in claim 8, further comprising:
    a light fixture mounted in said housing; and
    a translucent lens hingedly coupled to said housing at said side, said translucent lens disposed adjacent to said light fixture.

14. A power housing assembly as in claim 13, further comprising a light sensor coupled to said light fixture for sensing ambient light conditions and adapted to control a supply of electrical energy to said light fixture based on the ambient light conditions sensed.

15. A power housing assembly, comprising:
- a rigid housing having a side thereof that is at least partially open, said housing including a terminal block integrated with an interior portion of said housing, said terminal block being made from an electrically insulating material, said terminal block including bosses adapted to support electrically-conductive terminal posts and a wall between adjacent ones of said bosses;
- a rigid faceplate coupled to said side of said housing at a first hinge position wherein said faceplate can rotate about said first hinge position between a first position and a second position, said faceplate including a substantially L-shaped portion that resides (i) in said housing when said faceplate is in said first position, and (ii) outside of said housing when said faceplate is in said second position; and
- a plurality of electrical components, each of said electrical components coupled to said faceplate, wherein access to portions of said electrical components requiring maintenance are accessible only when said faceplate is in said second position.

16. A power housing assembly as in claim 15, further comprising a rigid wedge-shaped door coupled to said faceplate at a second hinge position located above said first hinge position when said faceplate is in said first position, said door having at least one open-ended slot adapted to receive a power line therethrough, wherein said door substantially covers said L-shaped portion when said faceplate is in said first position and is rotatable about said second hinge position to expose said L-shaped portion.

17. A power housing assembly as in claim 15, further comprising a hood coupled to said housing for shielding a portion of said faceplate when said faceplate is in said first position.

18. A power housing assembly as in claim 15, further comprising:
- a light fixture mounted in said housing; and
- a translucent lens hingedly coupled to said housing at said side, said translucent lens disposed adjacent to said light fixture.

19. A power housing assembly as in claim 18, further comprising a light sensor coupled to said light fixture for sensing ambient light conditions and adapted to control a supply of electrical energy to said light fixture based on the ambient light conditions sensed.

* * * * *